United States Patent [19]

Wickoren

[11] Patent Number: 4,474,713
[45] Date of Patent: Oct. 2, 1984

[54] INCLINED TUBULAR AERATION APPARATUS

[75] Inventor: Dean Wickoren, Stovall, Miss.

[73] Assignee: Hydraulic & Heavy Equipment, Inc., Clarksdale, Miss.

[21] Appl. No.: 406,712

[22] Filed: Aug. 9, 1982

[51] Int. Cl.³ .............................................. B01F 3/04
[52] U.S. Cl. .................................. 261/108; 210/150; 210/167; 261/36 R; 261/76; 261/DIG. 75; 261/DIG. 79
[58] Field of Search ............. 261/36 R, 112, DIG. 75, 261/DIG. 79, 114 R, 76, 108; 210/150, 167, 210/629; 239/17

[56] References Cited

U.S. PATENT DOCUMENTS

| | | | |
|---|---|---|---|
| 125,162 | 4/1872 | Backus | 261/112 |
| 537,392 | 4/1895 | Moore | 261/112 |
| 1,455,930 | 5/1923 | Nobis | 261/112 X |
| 1,874,849 | 8/1932 | Danforth | 261/36 R X |
| 2,756,976 | 7/1956 | Jalma | 261/36 R X |
| 3,112,261 | 11/1963 | Porter et al. | 210/150 X |
| 3,493,216 | 2/1970 | Johnson | 261/36 R |
| 3,555,786 | 1/1971 | Cochran | 261/112 X |
| 3,680,845 | 8/1972 | Carlsmith et al. | 261/112 X |
| 3,840,457 | 10/1974 | Wilson | 261/DIG. 75 |
| 4,301,097 | 11/1981 | Curtis | 261/36 R X |

Primary Examiner—Richard L. Chiesa
Attorney, Agent, or Firm—Brezina & Buckingham

[57] ABSTRACT

This invention provides for a system for the year-round aeration of lagoons, ponds, small lakes and the like, providing greatly improved circulation and saturation of effluent with dissolved oxygen, further providing advantages of portability and remote location of inlet, discharge and pump; and utilizing a device incorporating internal baffles within an adjustably inclined chute incorporating covers and discharge extension and movable mounted upon a suitable vehicle.

5 Claims, 9 Drawing Figures

INCLINED TUBULAR AERATION APPARATUS

BACKGROUND OF THE INVENTION

The primary object of the invention is to provide for the efficient saturation of large volumes of water drawn from lagoons, ponds, or the like, with atmospheric oxygen and return thereof to the body from which the affluent is drawn. The invention further provides for the use of an intake location from which affluent is drawn and a discharge location at which effluent is returned, which locations may be remote from each other and may use multiple locations depending upon the bottom topography of the specific body to the aerated. The invention further provides for the portability of the device and the system used and, therefore, use of these at multiple locations over a relatively short period of time, particularly during the season when lagoons and ponds are ice covered, at which time aeration becomes critical.

The prior art incorporates both elaborate water treatment systems and simple, but relatively ineffective, baffle systems for increasing the surface area of a flow of affluent with the atmosphere.

In the field of waste water treatment, affluent is frequently treated through the mere placement thereof in shallow lagoons of relatively large surface area. The primary purpose of this is to permit the settling of relatively more dense organic matter, and to permit the growth of microorganisms to break down organic matter, which then settles as sludge, to be removed upon draining of the lagoons. Secondary treatment of waste water is commonly accomplished through the spraying of the primarily treated liquid affluent over beds of gravel, which gravel provides a further habitata for the affixation of additional microorganism on the surface thereof, which microorgansims further breakdown organic matter in the affluent, thereby yielding a relatively organism and nutrient free effluent.

In both the primary and secondary treatment methods, the exposure of the affluent to atmospheric oxygen is incidental to the purpose of permitting relatively broad exposure of the affluent to the appropriate microorganism cultures for treatment. Indeed, anaerobic bacteria in waste water treatment is an important component and evolves in a non-aerated affluent.

Apparatus designed for the purpose of aeration is known in the prior art, but is generally both fixedly mounted and requires relatively large complex machinery. Said aeration devices commonly provide extremely large percentages of dissolved atmospheric oxygen per unit of affluent, but are hampered in their effectiveness by the relatively small flow of the liquid when compared with the total size of the installation. This disadvantage is common in all of the spraying or agitation type devices, such as that revealed by Jalma, U.S. Pat. No. 2,756,976, or Porter, U.S. Pat. No. 3,112,261.

Baffles have been used for the purpose of both enhancing the evaporation of flowing water for humidifier purposes, and in lagoon aeration contexts, such as disclosed by Johnson, U.S. Pat. No. 3,493,216. Prior art usage of baffles has been specifically designed to deal with the use thereof to direct the flow of affluent through a maze-like course, thereby resulting in increased contact of the surface of the affluent with the atmosphere. However, while these devices provide the advantage of relatively larger flow for a given size of installation, they have the disadvantage of having a relatively small resultant percentage of dissolved oxygen per unit of effluent.

In addition to the performance disadvantages of prior art devices, said devices are almost wholly ineffective in combatting the problem of winter kill in natural areas with numberous small lakes, lagoons, or ponds. This application requires that the advantage of portability and consequent rapid deployment, the ability to perform with relatively small intake and outlet holes in ice coverings, and high flow rate in combination with high saturation rate.

SUMMARY OF THE INVENTION

In operation of the invention an intake opening is used which is placed in the liquid water through placement at the short, or through a hole in ice cover. Through the use of closed piping, affluent is drawn from the body of water through the use of a pumping device. In various embodiments this pumping device may be motor driven, driven off a power take-off of a vehicle, or the like. This affluent is then carried under pressure provided by the pumping device closed water carrying piping, or the like, to the intake piping of the aerator device.

Sufficient pressure is necessary to permit the raising of the affluent from lake level through the intake portion of the aerator device, which may be fourteen feet above the level of the place of contact of the trailer wheels with the surface and the swivel connection of the intake pipe being somewhat lower than the topmost portion of the structure.

Upon entry into the aerator device, the affluent thus carried under pressure enters the aerator body's intake portion which is on a substantially greater cross-sectional area than the water carring piping and intake pipe. The intake cover in one embodiment is raised above the level of the sidewalls providing a substantial opening for the entry of atmospheric air into the aerator body.

Through a combination of the effect of the pressure changes and the pull of gravity, the affluent flows in a direction generally parallel to the floor of the aerator body. The placement of internal baffles interrupts the generally parallel, downwardly inclined flow, providing localized changes of the direction of flow at or near the baffles, as well as an effect of eddying and splashing the inclinedly flowing affluent. In addition, the baffles incorporate openings in the surfaces thereof through which affluent can pass, further inducing directional and pressure changes and exposing greater portions of said affluent to the atmospheric air for the infusion of atmospheric oxygen. In addition, the openings at the junction of the horizontal baffles with the aerator body floor provide the necessary draining function so that upon cessation of operation substantial water is not retained within the aerator body.

Upon passage of the affluent over the series of baffles utilized in the invention, the infusion of atmospheric oxygen suitably aerates the affluent so that the deleterious effects of absence of oxygen are greatly reduced in the outwardly flowing effluent. Said effluent is directed through the use of a discharge chute to return to the body of water. Said discharge chute may be positioned in such a way as to direct the returned effluent substantially away from the base for the trailer wheels, be it ice or beach, thereby avoiding the erosion thereof and the potential consequences of the aerator device becoming mired or frozen during the course of operation.

DESCRIPTION OF THE PREFERRED EMBODIMENT

The invention utilizes a combination of a floor member, upstanding sidewall members, end panel, top cover and discharge chute utilizing a plurality of internal baffles, said baffles themselves being provided with aeration openings. The device further incorporates a pivot mounting by virtue of which the aerator body is rotatably mounted around a horizontal axis, thereby enabling the raising and lowering thereof to accommodate minimizing vertical clearance and adding of structural strength for transport and providing for an adjustable angle of flow.

The invention further incorporates the rotatably mounted intake pipe utilizing a swivel connection at the topmost portion of one sidewall thereof, thereby permitting inlet of affluent while obviating the requirement for detachment for transport.

In its preferred embodiment the invention incorporates the use of sixteen baffle plates fixedly mounted on the interior of the walls and floor of the aerator body and inclined in the direction of flow of affluent. The baffles are mounted in an evenly spaced manner along the floor of the aerator body, with each alternative floor mounted horizontal baffle associated with a pair of vertically mounted baffles mounted to the upstanding sidewalls of the aerator body. The horizontal baffles incorporate an aeration enhancing and draining opening at the junction with the floor of the aerator body, at or near the center, while the vertical baffles utilize openings centrally located in the upper portion thereof, permitting flow through of liquid and further enhancing the agitation of the affluent and resulting exposure to atmospheric oxygen.

The pivotal mounting of the aerator body, in addition to facilitating the transport and self-draining features, provides for the use of supporting members of varying lengths, thereby providing for an adjustable working angle. Although in the preferred embodiment the supporting member is provided so as to provide a flow angle of approximately 45° from the vertical, which facilitates maximum absorption and flow rate, an adjustable support member would provide for variation in angle as necessary. Variation in working angle can increase or decrease time of suspension of affluent, speed of flow, and the degree of agitation and absorption of atmospheric oxygen. The provision for adjusting the working angle can be utilized to optimize the inversely related time of suspension and degree of agitation rate with speed of flow as necessary depending upon ecological conditions such as length of time of ice coverage, fish population, water volume of the body of water, and length of time since last exposure to atmospheric oxygen. Variable angles can further be used to compensate for such factors as location of the trailer on a slope which changes the working angle from the optimum relation to the vertical, or environmental condtions such as temperature and humidity which may vary absorption and require variation of flow speed.

The inlet end of the aerator body is provided with a top cover to permit access and inspection as well as to prevent spilling, which greatly reduces the volume of flow. The inlet cover further provides for ambient air intake. The balance of the aerator body is further provided with full length cover fixedly mounted which further controls spilling and directs the flow.

The discharge portion of the aerator body is provided so as to permit the return of aerated effluent into the aerated body of water at a point near the position of the aerator device. Discharge extensions are provided of substantial enough length to direct flow of the effluent return to the body of water a sufficient distance beyond the position of the device so as to permit placement of the device directly upon a beach or the surface of ice cover of the body of water so as to avoid either erosion or the formation of ice near the wheels of the trailer, depending upon environmental conditons. The discharge extension may also provide for control of the location of the effluent flow where variances in working angle are effectuated.

The aerator body is pivotally mounted upon a wheeled framework in such a manner as when said framework incorporating trailer hitch means is on a level surface, the intake portion of the aerator body, when in its transport position, rests upon the framework and is located lower than the discharge portion. This provides for a forwardly sloping angle in the transport position, thereby facilitating both the draining of any retained water, and further improves the trailerability of the entire device at highway speeds. The pivot is further located rearwardly enough that the weight distribution is such that the weight of the aerator body is maintained on the upward and forwardmost portion thereof in the transport position, which uppermost portion rests upon a cradle incorporated in the framework. The pivot point is further located rearwardly enough from the wheels of the framework so as to provide sufficient distance between said wheels and the discharge of effluent so as to avoid the erosion of soil or melting of ice and a resultant loss of support for the aerator unit.

The aerator unit is incorporated into an aeration system which provides for the removal and return of water from lakes, ponds, lagoons, or the like, providing for the aeration through the agitation and exposure to atmospheric oxygen of affluent. THe system further incorporates the features of the portability of the aeration unit, thereby permitting the ready use of the aeration system in multiple lakes, or the like, over the course of a season, particularly during the period when said lakes, or the like, are covered with ice, thereby preventing exposure of the surface thereof to atmospheric oxygen.

The system further incorporates the use of a remote inlet and pumping device which is connected to the aerator unit through the use of water carrying piping or tubing. The remote inlet feature of the system permits maximum aeration of the body of water because of the facility for promoting circulation of the retained water. In addition, in circumstances where local bottom topography provides for the need for circulation from multiple inlets, the use of remote inlets permits intake from remote locations with minimal transport of the aeration unit and avoids the need for multiple units, which would be required under the prior art.

The system further incorporates the use of the aeration unit which may be situated either on the shore, or on solid ice, while requiring a relatively small hole be placed to permit discharge of effluent into the body of water, while similarly requiring the use of a relatively small hole in the surface of the ice cover for the intake. The system does away with the requirement of prior art which would necessitate the opening of large areas of open water for the placement of the aeration unit.

Notwithstanding the durable construction and self draining features of the aeration unit which permit use in conditions where the ambient temperature is below the freezing point of water, the invention is well suited to use year 'round as necessary. The portability feature is an advantage in summer months as well wherever ecological conditions require aeration. The portability feature permits ready deployment of the system should conditions require it, while the large flow provides a rapid aeration which may facilitate completion of a job at one location and the rapid breakdown and transport and deployment at another location requiring aeration. Such ecological conditions as algal blooms during summer months and ice cover during winter months which critically affect exposure to atmospheric oxygen may vary from time to time and from location to location, and thereby require both the rapid deployment feature and large flow capacity of the invention.

The system further provides for maximization of flow because of the use of closed inlet piping and top covers to avoid spilling and loss of retained oxygen, as well as variable work angle.

DETAILED DESCRIPTION OF THE DRAWINGS

Figure 1:
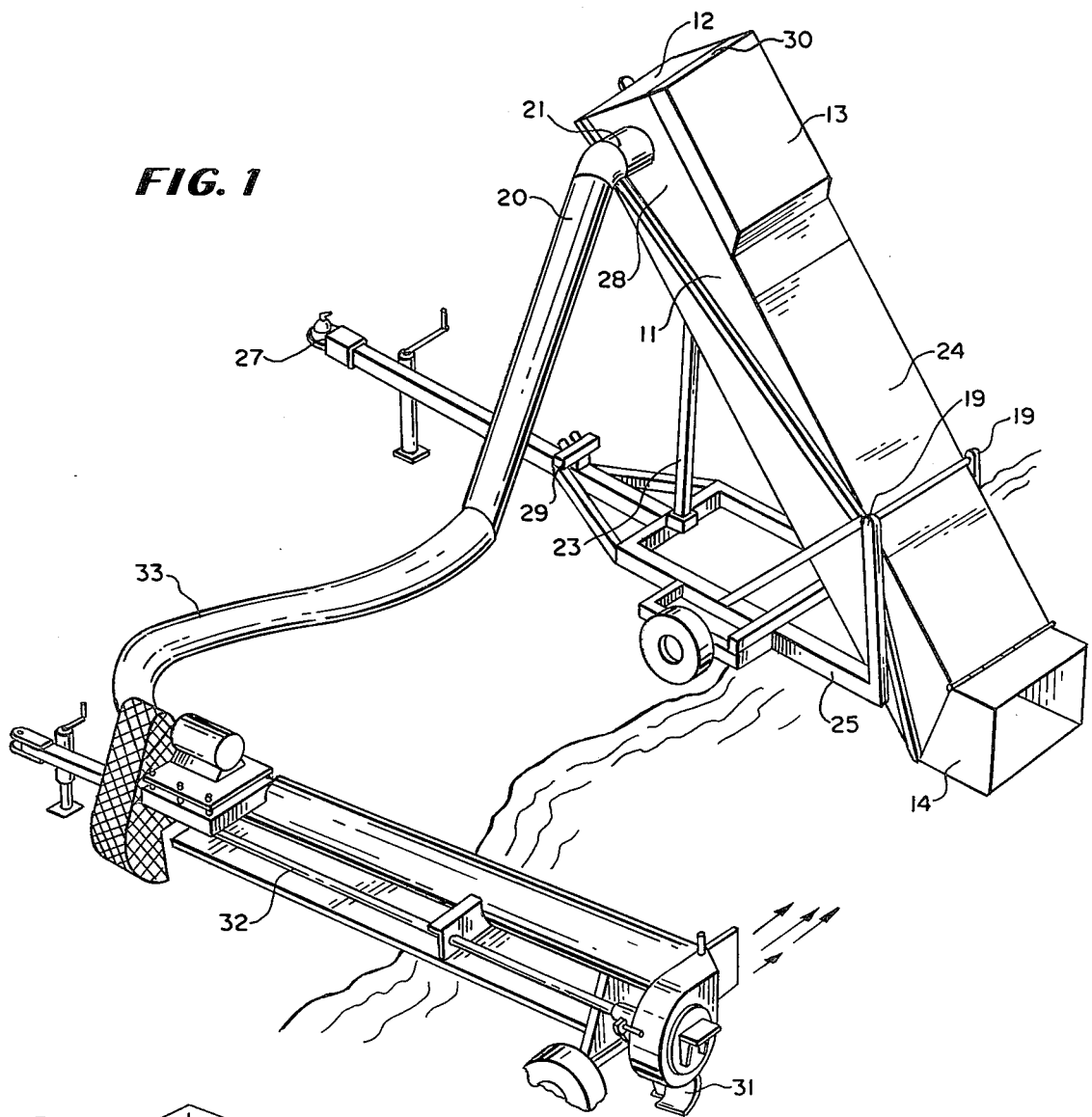
FIG. 1 is a perspective view of the device in operation.

FIG. 1 is a perspective drawing of the aerator device in its operating position. Apparent in this drawing are the sidewall, 11, end panel, 12, intake cover, 13, and baffle cover, 24, which elements are all part of the basic structure of the aerator body. The intake cover, 13, provides an atmospheric air intake, 30.

Further apparent in FIG. 1 is the intake pipe, 20, rotatably mounted through the use of the swivel connection, 21, to the sidewall, 11, at the intake, or upper, portion, 28, of the aerator body. Also apparent in FIG. 1 is the use of the discharge chute, 14.

The aerator body in FIG. 1 is pivotally mounted at pivot point, 19, to a trailer framework, 25. This trailer framework further incorporates a cradle, 29, and trailer hitch, 27. Also apparent in this figure is the support member, 23, which serves to maintain the aerator body in an inclined position on its pivotal mounting on the trailer framework.

Also apparent in this view are the remote inlet, 31, the pump unit, 32, and the affluent carrying piping, 33.

Figure 2:
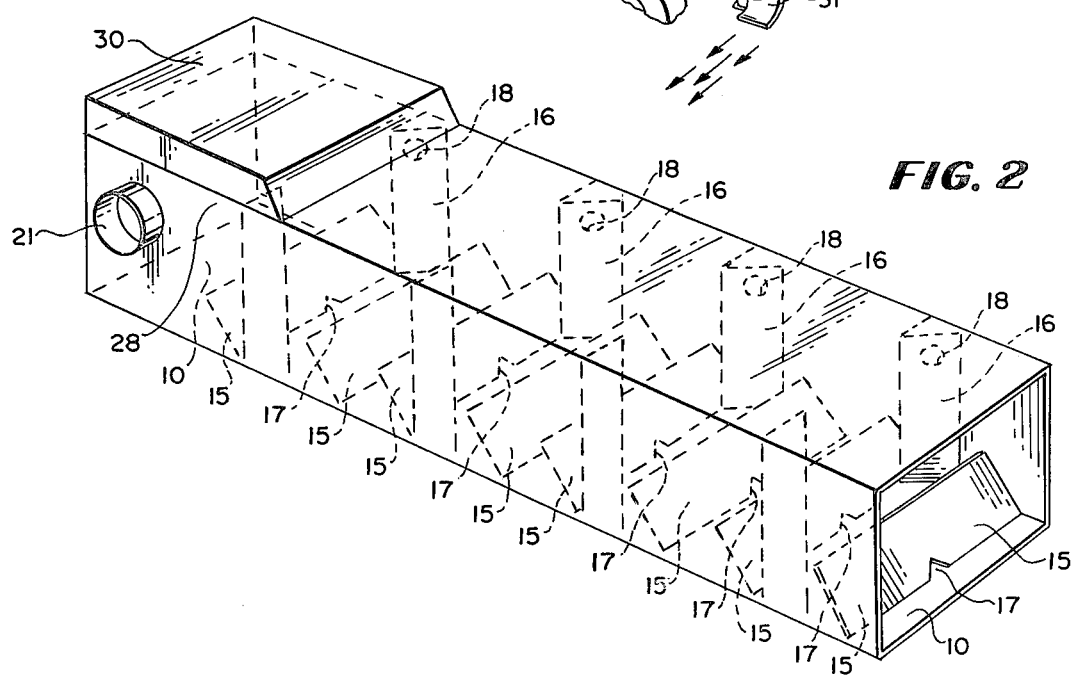
FIG. 2 is a perspective view of the aerator body with the support structure and intake piping removed for clarity.

FIG. 2 is a perspective view of the aerator body with the support structure and intake piping removed for clarity. The aerator body incorporates internal baffles oriented along the horizontal axis, 15, and vertical axis, 16 relative to the floor member, 10. Also apparent are notch, or "V"-shaped aeration openings, 17, centrally located on the horizontal baffles at the floor junction, as well as the circular aeration openings, 18, located near the top of the vertical baffles.

Figure 3:
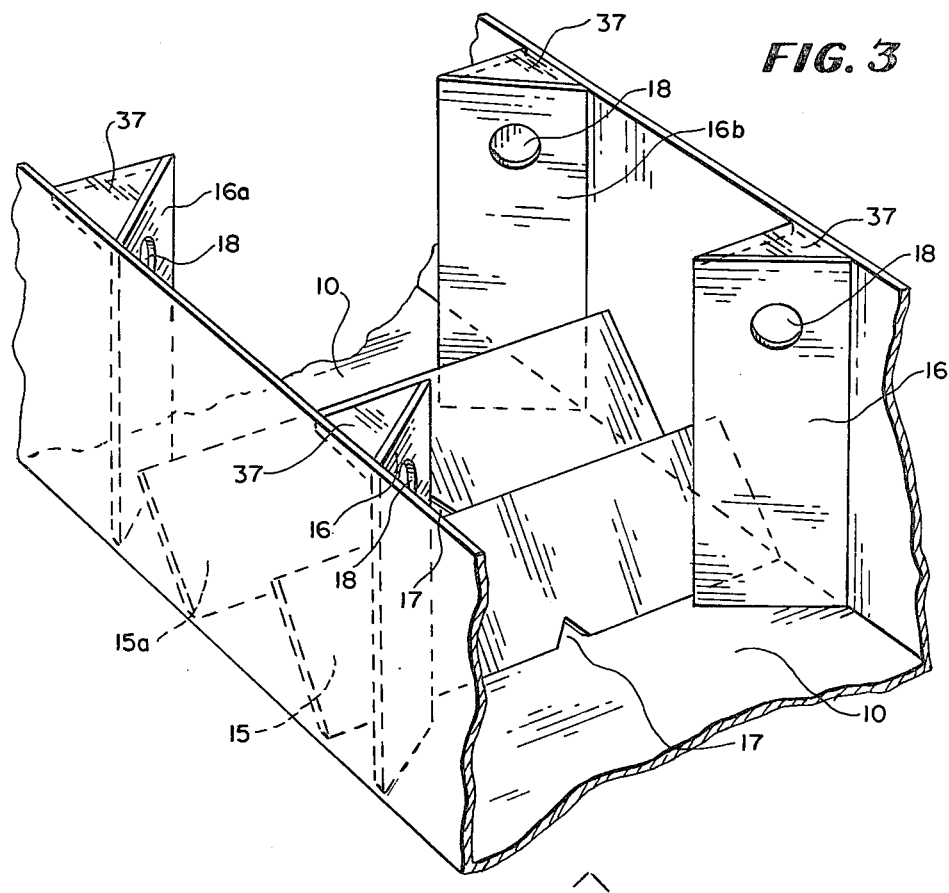
FIG. 3 is perspective view of a section of the aerator body with a portion of the cover and side wall cut away.

FIG. 3 is a perspective view of a baffle section of the aerator device in which the baffle top cover has been removed for clarity. Apparent in FIG. 3 are the horizontal baffles, 15, in this embodiment placed in such a way as to provide for a baffle, 15a, placed in close proximity to each pair of vertical baffles, 16a and 16b, on the upstream side thereof, and an additional horizontal baffle placed immediately downstream of said pair of vertical baffles, 16. Also apparent in FIG. 3 are the horizontal baffle aeration openings, 17, which in this embodiment are notched or "V"-shaped and located along the central axis of the floor of the aerator body at the junction of each horizontal baffle with said floor, 10. FIG. 3 also displays the arrangements for the mounting of the vertical baffles, 16, utilizing reinforcement plates, 37, at their top ends. Also apparent in this view are the vertical baffle aeration openings, 18, located near the top portions of the vertical baffles.

Figure 4:
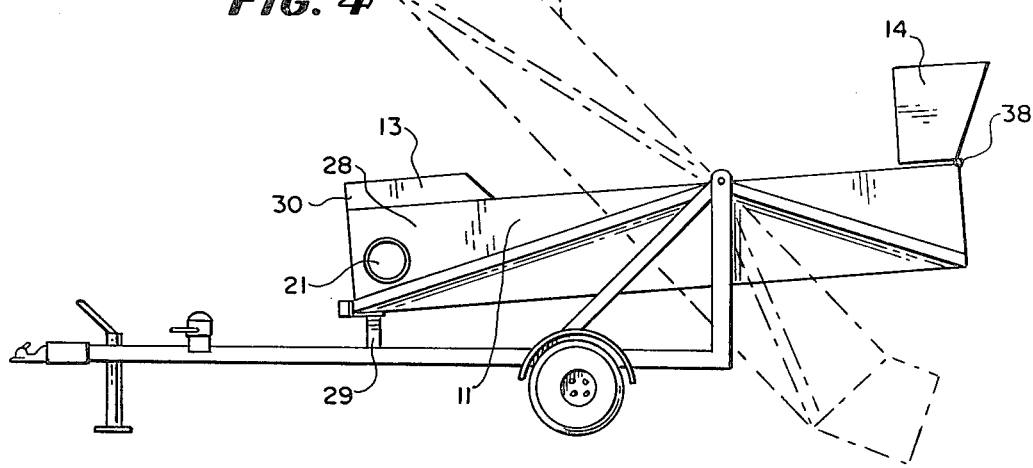
FIG. 4 is a left side elevational view of the aerator device with the aerator in its operating position in solid lines and the transport position indicated in dashed lines.

FIG. 4 is a left side elevational view of the aerator device on its trailer framework. This view shows the aerator in its transport position resting on the cradle, 29, with the supporting member and intake pipe removed for clarity. Apparent in FIG. 4 are the swivel connection, 21, located in the sidewall, 11, of the aerator body at the intake portion thereof, 28. Also apparent in this elevational view is the intake cover, 13, which in this embodiment is raised to provide an opening for the entrance of atmospheric air, 30. The discharge chute, 14, in this embodiment utilizes a hinge, 38, to provide for its rotation when either not in use in operation, or for transport.

Figure 5:
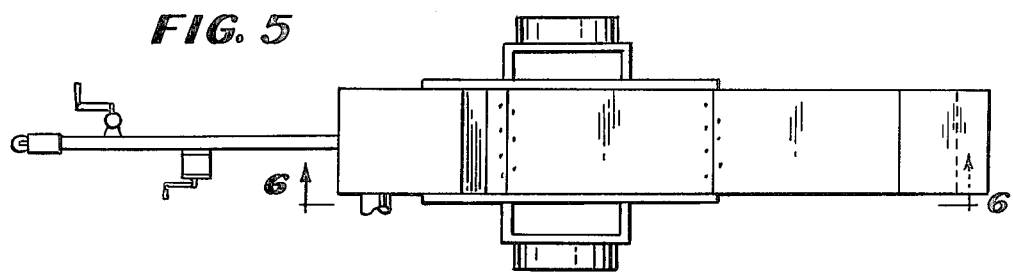
FIG. 5 is a top plan view of the device.

FIG. 5 is a top plan view of the aerator device in its transport position with the intake pipe removed for clarity.

Figure 6:
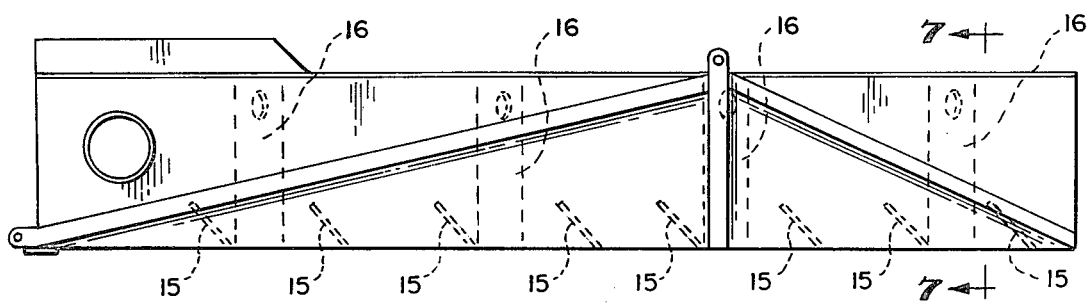
FIG. 6 is a left side elevational view of the aerator body.

FIG. 6 is a left side elevational view of the aerator body showing the external support structure and the location of the internal baffles, 15 and 16.

Figure 7:
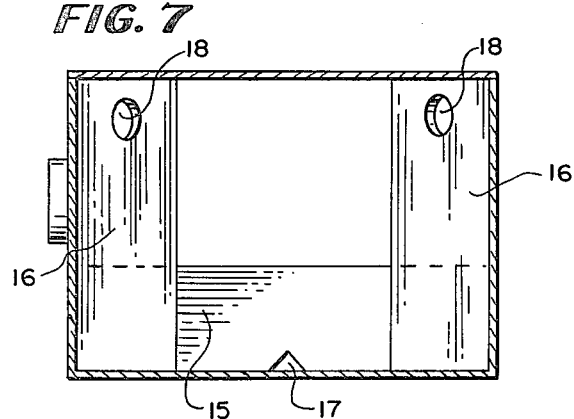
FIG. 7 is a rear plan view of the aerator body.

FIG. 7 is a rear plan view of the discharge end of the aerator body showing the location and relationship between the vertical and horizontal baffles, 15 and 16 respectively, in one baffle section.

Figure 8:
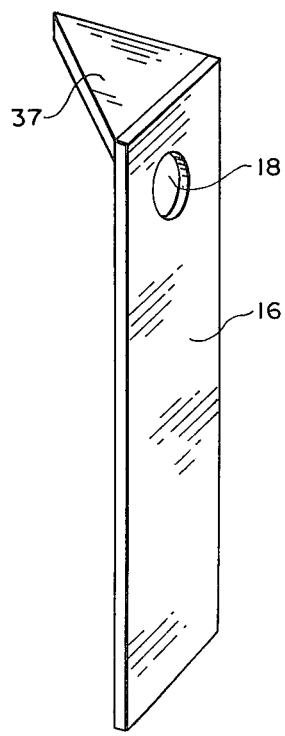
FIG. 8 is a perspective view of a vertical baffle and gusset.

FIG. 8 is a perspective view of a right side vertical baffle, 16, showing its structure, the reinforcing plate, 37, and the location of the aeration opening, 18.

Figure 9:
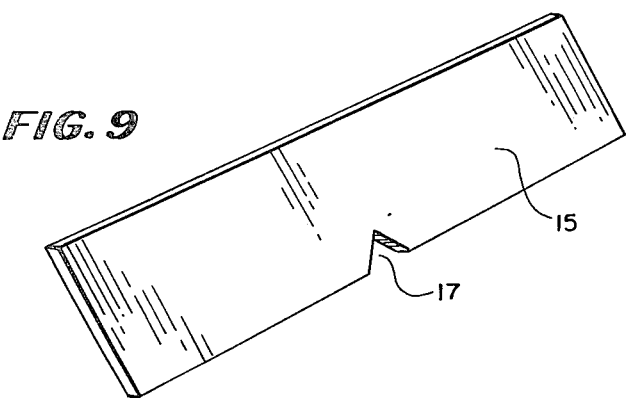
FIG. 9 is a perspective view of a horizontal baffle.

FIG. 9 is a perspective view of a horizontal baffle, 15, showing its structure and the location of the aeration opening, 17.

In accordance with my invention, I claim:

1. An aeration device for increasing the absorbed oxygen content of water or the like, comprising a longitudinal tubular aeration body, means for supporting said body in an inclined position, water intake means at the upper portion of said tubular aeration body for admitting untreated water, air intake means at the upper portion of said aeration body for admitting air under force created by the flow of said water, and baffle means mounted in the interior of said aeration body, said baffle means including a group of upright opposing baffles, defining a flow path, each baffle angularly extending from a side wall of said body in an upstream direction at an angle of less than 90°, and further including a group of transverse baffles extending across said aeration body, each transverse baffle angularly extending from a bottom of said body in the upstream direction at an angle of less than 90°, both of said groups of baffles being arranged along the length of the body in an alternating manner, whereby maximum turbulence in said water is created by the coacting of the two groups of baffles to efficiently incorporate oxygen from the forced air flowing through said body.

2. An aeration device for incorporating absorbed oxygen into a water affluent or the like, comprising a longitudinal tubular body, formed by a top and bottom joined by side walls, means for mounting said body in an inclined position, untreated water intake means at the upper portion of said tubular body for introducing said untreated water into said body, air intake means at the upper portion of said aeration body for admitting air under force created by the downward flow, said water and baffle means disposed within the body, said baffle means including a plurality of groups of baffles, a first plurality of groups comprising upright baffles extending perpendicularly to the bottom of the body and a second plurality of groups comprising horizontal baffles extending from the bottom and between said walls, both of said groups being spaced along the length of said tubular body, one group of upright baffles alternating with a group of horizontal baffles, each upright baffle angularly extending from a sidewall in the upstream direction at an angle of less than 90°, and said horizontal baffles extending from said bottom in the upstream direction at an angle less than 90°, whereby maximum turbulence in said water is created by the coaction of both groups of baffles to efficiently incorporate oxygen in the forced air flowing through said body.

3. An aeration device for incorporating absorbed oxygen into a water affluent or the like, comprising a longitudinal tubular body, formed by a top and bottom joined by side walls, means for mounting said body in an inclined position, untreated water intake means at the upper portion of said tubular body for introducing said untreated water into said body, air intake means at the upper portion of said aeration body for admitting air under force created by the downward flow, said water and baffle means disposed within the body, said baffle means including a plurality of baffles, a first plurality comprising upright baffles extending perpendicularly to the bottom of the body and a second plurality comprising horizontal baffles extending between said walls, said baffles being spaced along the length of said tubular body, one group of upright baffles alternating with at least one horizontal baffle, each upright baffle angularly extending from a sidewall in the upstream direction at an angle of less than 90°, and said horizontal baffle extending from said bottom in the upstream direction at an angle less than 90°, whereby maximum turbulence in said water is created by the coaction of said baffles to efficiently incorporate oxygen in the forced air flowing through said body.

4. An aeration device for increasing the absorbed oxgyen content of water or the like, comprising a longitudinal tubular aeration body, means for supporting said body in an inclined position, water intake means at the upper portion of said tubular aeration body for admitting untreated water, air intake means at the upper portion of said aeration body for admitting air under force created by the flow said water, and baffle means mounted in the interior of said aeration body, said baffle means including a group of upright opposing baffles, defining a flow path, each baffle angularly extending from a side wall of said body in an upstream direction at an angle of between 40° and 50°, and further including a group of transverse baffles extending across said aeration body, each transverse baffle angularly extending from a bottom of said body in the upstream direction at an angle of between 40° and 50°, both of said groups of baffles being arranged along the length of the body in an alternating manner, whereby maximum turbulence in said water is created by the coacting of the two groups of baffles to efficiently incorpprate oxygen from the forced air flowing through said body.

5. An aeration device for incorporating absorbed oxygen into a water affluent or the like, comprising a longitudinal tubular body, formed by a top and bottom joined by side walls, means for mounting said body in a longitudinally inclined position, untreated water intake means at the upper portion of said tubular body for introducing said untreated water into said body, air intake means at the upper portion of said aeration body for admitting air under force created by the downward flow, said water and baffle means disposed within the body, said baffle means including a plurality of baffles, a first plurality comprising upright baffles extending perpendicularly to the bottom of the body and a second plurality comprising horizontal baffles extending between said walls, said baffles being spaced along the length of said tubular body, one group of upright baffles alternating with at least one horizontal baffle, each upright baffle angularly extending from a sidewall in the upstream direction at an angle of between 40° and 50°, and said horizontal baffle extending from said bottom in the upstream direction at an angle of between 40° and 50°, whereby maximum turbulence in said water is created by the coaction of said baffles to efficiently incorporate oxygen in the forced air flowing through said body.

* * * * *